United States Patent [19]

Seibig et al.

[11] Patent Number: 4,848,935
[45] Date of Patent: Jul. 18, 1989

[54] ADAPTER ELEMENT

[75] Inventors: Bernd Seibig; Alfred Reymann, both of Geesthacht; Helmut Dittmer, Nindorf, all of Fed. Rep. of Germany

[73] Assignee: GKSS-Forschungszentrum Geesthacht GmbH, Geesthacht, Fed. Rep. of Germany

[21] Appl. No.: 160,886

[22] Filed: Feb. 26, 1988

[30] Foreign Application Priority Data

Feb. 27, 1987 [DE] Fed. Rep. of Germany ....... 3706365

[51] Int. Cl.⁴ .................... F16C 33/02; F16C 27/00
[52] U.S. Cl. .................... 384/276; 384/215; 384/278; 384/905; 403/30; 403/179; 403/203
[58] Field of Search ............ 384/103, 125, 215, 276, 384/278, 280, 295, 296, 428, 493, 557, 605, 627, 905; 403/179, 202, 203, 28–30

[56] References Cited

U.S. PATENT DOCUMENTS

| 3,263,907 | 8/1966 | Van Nimwegen et al. ..... 384/215 X |
| 3,467,451 | 9/1969 | Marley ................. 384/215 |

FOREIGN PATENT DOCUMENTS

| 293144 | 5/1971 | U.S.S.R. .............. 384/215 |
| 1224483 | 4/1986 | U.S.S.R. .............. 384/215 |
| 645401 | 11/1950 | United Kingdom ....... 384/493 |
| 2123497 | 2/1984 | United Kingdom ....... 384/215 |

Primary Examiner—Thomas R. Hannon
Attorney, Agent, or Firm—Becker & Becker, Inc.

[57] ABSTRACT

An adapter element that allows machine elements to be accommodated in a centered manner with zero play, with these machine elements having different thermal expansions over broad temperature ranges. The adapter element has a sleeve-like portion that has tongue-like regions defined therefrom. Flattened or planar regions are provided on the inner and/or outer surface of the sleeve-like portion, with these planar regions at least partially overlapping the tongue-like regions.

7 Claims, 1 Drawing Sheet

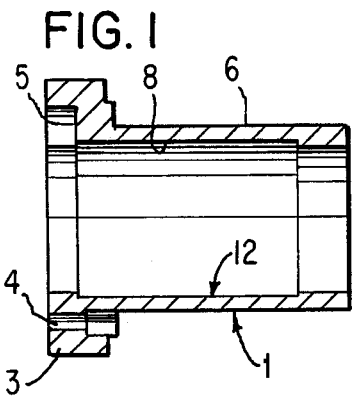
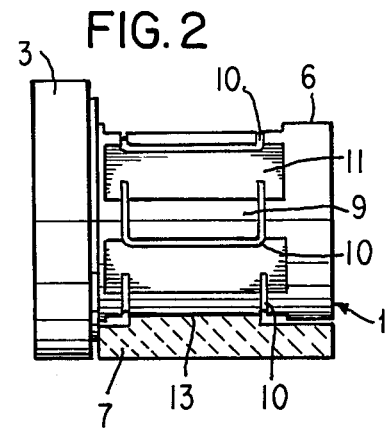
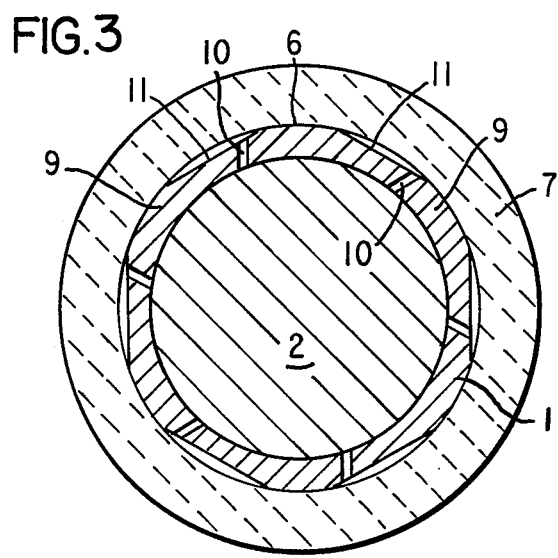

ADAPTER ELEMENT

BACKGROUND OF THE INVENTION

The present invention relates to an adapter element that allows machine elements to be accommodated in a centered manner with zero play, whereby the machine elements have different thermal expansions over broad temperature ranges.

The compensation of the temperatures of machine elements, especially components of bearings and other support elements, is a technical problem if broad temperature ranges are to be embraced during operation, and the machine elements are made of materials that have very different expansion characteristics. Such practically insurmountable difficulties occurred in particular with friction or sleeve bearings of metal-ceramic connections, for example in coolant circulating pumps, such as slotted tube motor-driven pumps. The operating temperatures of such pumps embrace a range of 20°–320° C. Similar types of problems occur with the construction of units used in low and high temperature technologies.

Simple technical solutions did not have the desired result of protecting the metal-ceramic connection from destruction by forces that act in the radial direction and are a function of temperature and expansion.

It has also been proven that tolerance limits that are too generous similarly lead to premature destruction of the bearing as a result of significant natural vibrations of the rotary shaft that now occur.

Thus, a general increased or decreased loosening was not acceptable as a compromise solution. Nor did tolerance rings provide the required specifications due to low temperature range values. In addition, such rings did not comply with the requirements for a centering or concentric arrangement of the metal-ceramic connection for the rotary shaft.

It is therefore an object of the present invention to design an adapter element of the aforementioned general type in such a way that it permits accommodation, in a centered manner with zero play, of articles, especially parts that move against one another and have different thermal expansions at temperatures ranging from the low temperature range encountered in cryogenics to about 600° C. encountered in high temperature technologies.

BRIEF DESCRIPTION OF THE DRAWINGS

This object, and other objects and advantages of the present invention, will appear more clearly from the following specification in conjunction with the accompanying schematic drawings, in which:

FIG. 1 is a cross-sectional view of one exemplary embodiment of the inventive adapter element;

FIG. 2 is a view onto the outer surface of the inventive adapter element, which in this case is in the form of a coupling sleeve; and FIG. 3 is a cross-sectional view showing the inventive adapter element disposed between a shaft and a bushing.

SUMMARY OF THE INVENTION

The adapter element of the present invention is characterized in that it has at least in part a sleeve-like configuration from which are defined tongue-like regions that are preferably oriented in the circumferential direction of the sleeve-like portion of the adapter element; flattened or planar regions are provided on the inner and/or outer surfaces of the adapter element, and at least partially overlap the flattened regions.

The particular advantage achieved with the adapter element of the present invention is that due to the flattening or relief milling, and the U-shaped tongues that are disposed on the periphery of the sleeve and are generated for example by sparking or laser beam resolution, it is possible to compensate for temperature-dependent changes in diameter, for example of a shaft-sleeve connection. The spring forces of the supporting tongues, which forces can be structurally influenced, accordingly make it possible to provide a temperature-dependent connection that has zero play and nearly unlimited service life.

Further specific features of the present invention will be described in detail subsequently.

DESCRIPTION OF PREFERRED EMBODIMENTS

Referring now to the drawings in detail, the inventive adapter element is formed from a coupling sleeve 1, such as a bearing coupling sleeve. The inner surface of the coupling sleeve 1 is seated on the outer surface of a shaft end 2 (see FIG. 3), with both the coupling sleeve 1 as well as the shaft 2 being made of the same material, e.g. high-grade or stainless steel. Provided at one end of the coupling sleeve 1 is a flange 3 that can be secured to shaft parts (not illustrated) via bolt or pin connections (see the recessed portions 4 and 5). Seated on the outer surface 6 of the coupling sleeve 1 is a bushing 7, for example a bearing bushing, made of ceramic material (SiC).

As shown in FIG. 2, tab or tongue-like portions 9 are formed or defined on the surface 6 of the sleeve 1 by generating U-shaped grooves or slots 10, for example by laser beam resolution. Other regions of the outer surface 6 are flattened to form planar surfaces 11, which are delimited by surface lines and secant lines. These planar regions 11 extend at least over the width of the tongues 9, as measured in the axial direction of the sleeve 1. The non-flattened regions continue to form the outer surface 6, which rests against the bushing 7. A gap exists between the shaft 2 and the adapter element 1 until the desired or intended temperature is reached. In the region of the tongues 9, the inner diameter of the sleeve 1 is enlarged (see FIG. 1).

Six tongues 9 are preferably disposed on the periphery of the sleeve 1 as spring elements. These tongues 9 do not expand until the operating temperature is reached, and are separated from the expanding parts by the slots 10. The increase in thickness of these spring elements 9 is compensated for by a presetting of the dimension of the carrier or support unit. However, it is also possible to compensate for this increase in thickness by a relief 12 in the region of the tongues, as shown in FIG. 1. For this reason, the accommodated ceramic part must be seated in the region 13 of the tongues only, as shown in FIG. 2. The positioning up to the operating point can be predetermined. The dimensions of the U-shaped slots 10 (their length and width), of the thus-formed tongues 9 (their length and width), of the flattened regions 11, and hence of the remaining surface regions 6, can be determined either experimentally or analytically, for example via a computer. These dimensions are also a function of the operating parameters, namely temperature and forces, and from the material that is used for the shaft and bearing parts.

It should be noted that it is also conceivable to provide the flattened regions 11 on the inner surface 8 of the sleeve 1, for example if the inner machine element 5 remains stationary.

Problems encountered with internal coolant circulating pumps, such as slotted tube motor-driven pumps, that circulate cooling water of 320° C. and 150 bar, make it necessary to constantly improve these components. A particular point of concentration was in the selection of a suitable bearing material, and in the improvement of the structure of the bearing.

Tests were carried out with bearing pairings carbon/$Cr_2O_3$, $ZrO_2$/$ZrO_2$, $Al_2O_3$/$Cr_2O_3$ and ball bearings of high-grade or stainless steel, but no acceptable service life was achieved. Already here problems were encountered with the accommodation of ceramic bearing parts. With an optimum bearing pairing with silicon carbide (SiC) against SiC, where one would expect a particularly long service life, an improper accommodation of the bearing parts led within 100 hours of operation to a complete destruction of the bearing.

This failure led to the development of the inventive adapter element, which compensates for the different thermal expansions of metal and ceramic, and ensures that the ceramic part will be accommodated in a centered manner with zero play.

With the aforementioned pump, the thermal expansion of the stainless steel pump shaft, on which the SiC bearing bushing is disposed, must be compensated for over the temperature range of 20°–320° C. Such a compensation was possible with the inventively developed adapter element.

In particular, a first pump that was equipped with the inventive adapter element achieved approximately 3000 hours of operation. Another pump is still in operation and has already operated for more than 6000 hours without any damage to the bearing. In addition, frequent starting and stopping does not adversely affect the operating behavior of the pump.

The present invention is, of course, in no way restricted to the specific disclosure of the specification and drawings, but also encompasses any modifications within the scope of the appended claims.

What we claim is:

1. An adapter element that allows machine elements to be accommodated in a centered manner with zero play as to a shaft, with these machine elements having different thermal expansions over broad temperature ranges from 20° C. to 600° C.; said adapter element comprises:

a sleeve-like portion having an inner surface and an outer surface, with tongue-like regions being defined in said sleeve-like portion and oriented in the circumferential direction thereof; planar regions are provided on at least one of said inner and outer surfaces of said sleeve-like portion, with said planar regions at least partially overlapping said tongue-like regions, said tongue-like regions with said planar regions providing supporting spring forces for a temperature-dependent connection having zero play as to a ceramic part accommodated in a centered manner on said shaft.

2. An adapter element that allows machine elements to be accommodated in a centered manner with zero play, with these machine elements having thermal expansions over broad temperature ranges; said adapter element comprises:

a sleeve-like portion having an inner surface and an outer surface, with tongue-like regions being defined in said sleeve-like portion; planar regions are provided on at least one of said inner and outer surfaces of said sleeve-like portion, with said planar regions at least partially overlapping said tongue-like regions, each of said planar regions being delimited by secant lines and surface lines of said sleeve-like portion.

3. An adapter element according to claim 2, in which said tongue-like regions are oriented in the circumferential direction of said sleeve-like portion.

4. An adapter element according to claim 2, in which each of said tongue-like regions has a first end that is connected to said sleeve-like portion, and a second free end remote from said first end, with each of said planar regions overlapping a respective one of said free ends of said tongue-like regions.

5. An adapter element according to claim 4, for use as a bearing coupling sleeve between a shaft and a bearing bushing.

6. An adapter element according to claim 5, for use as a bearing coupling sleeve between a metal shaft and a ceramic bearing bushing.

7. An adapter element according to claim 4, for use as a bearing coupling sleeve for bearings in coolant circulating pumps.

* * * * *